UNITED STATES PATENT OFFICE.

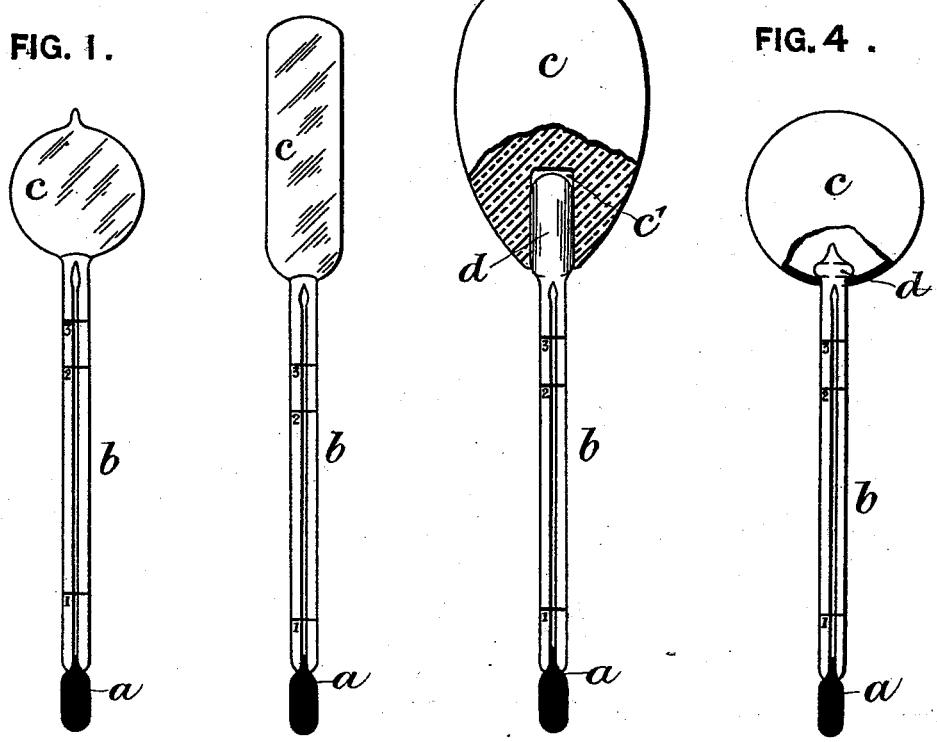

JAMES J. HICKS, OF LONDON, ENGLAND.

THERMOMETER.

SPECIFICATION forming part of Letters Patent No. 496,783, dated May 2, 1893.

Application filed November 23, 1892. Serial No. 452,904. (No model.)

*To all whom it may concern:*

Be it known that I, JAMES JOSEPH HICKS, a subject of the Queen of Great Britain, residing at Hatton Garden, London, in the county of Middlesex, England, have invented certain new and useful Improvements in Thermometers for Clinical and other Purposes, of which the following is a specification.

The invention relates to improvements in thermometers which can be used for ordinary clinical purposes and to indicate the temperatures of baths, food, &c. For this purpose I construct a thermometer according to any well known system of constructing a clinical thermometer, that is to say, I provide it with a bulb and a fine bore or capillary tube, so as to obtain a very open scale, and self-registering or not as may be desired. I make only a few divisions on the scale, say three, the lowest of which may indicate the temperature of a tepid bath, the intermediate division that required for a baby's food, temperature and warm bath, and the highest that of a hot bath. The divisions on the scale may be of other number and otherwise arranged, that is to say, to indicate other desired temperatures, but in any case I make the divisions only at those points indicating the temperatures it is desired to obtain or ascertain. I also form on or attach to the index or capillary tube, a bulb, either of glass or other material, of any suitable shape and dimensions, which is so proportioned as to enable the thermometer to float in a bath or, if desired, in food or other liquid. When the float is made of glass, it will be fused to the upper end of the index or capillary tube, but when made of other material, said float and tube will be so formed as to be capable of ready connection and disconnection. The float serves as an efficient handle whereby the thermometer can be safely and more easily handled and is located at the upper end of the tube in order that it will support the tube upright, the heavy mercury bulb being thus made to hang from the floating bulb.

My invention is illustrated in the accompanying drawings, in which—

Figures 1 and 2 represent two thermometers provided with floats formed of glass. Fig. 3 represents a similar thermometer provided with a float made of cork, and Fig. 4 represents a similar thermometer with a float consisting of a hollow india rubber ball.

In all the figures like parts are indicated by similar letters of reference.

$a$ represents the bulb of the thermometer, $b$ the index or capillary tube and $c$ the float.

As represented at Figs. 1 and 2, the float $c$ is made of glass, which is fused to the upper end of the index or capillary tube $b$.

As represented at Fig. 3, the float $c$ is formed of cork, in which case it is made with a hole $c'$ to receive and fit tightly the enlargement $d$ formed on the upper end of the thermometer.

As represented at Fig. 4, the float $c$ consists of a hollow india rubber ball with a hole therein, through which the enlargement $d$ formed on the upper end of the thermometer is passed, and such hole is smaller in diameter than the tube $b$, so that the india rubber shall fit tightly around said tube. The tube $b$, instead of being divided as usual along the entire length thereof, has only the special divisions thereon which indicate the temperatures desired to be obtained or ascertained. In the examples shown in the drawings I employ three divisions, the first of which is marked 1 and indicates the temperature required for a tepid bath, viz., 75°, the second division, marked 2, indicates the temperature required for a baby's food, the temperature of a baby in a state of health, and that required for a warm bath, viz., 98.4°, and the third division, marked 3, indicates the temperature required for a hot bath, viz., 103°.

By the use of a thermometer constructed as above described, the thermometer can be floated in water or in a baby's food and, by having only the divisions indicating the temperatures of the same, there cannot be any possibility of mistaking one division for another, thus safeguarding a child from being accidentally supplied with food or with a bath either above or below the temperature required.

Having fully described my invention, what I desire to claim and secure by Letters Patent is—

1. A thermometer provided with a float at its upper end the mercury bulb at its lower end, and having between said float and bulb, the special divisions and figures required to indicate a small number of temperatures, substantially as herein shown and described and for the purpose stated.

2. A thermometer having a capillary tube, a bulb at bottom of said tube containing the expansible medium, and a float at the top of said tube which supports the thermometer in upright position when immersed, substantially as explained.

3. A thermometer having in addition to the bulb for the expansible medium, a detachable float on the upper end of the capillary tube, whereby the instrument is adapted to be immersed and supported upright in a liquid, as explained.

4. A thermometer having the usual bulb for containing the expansible medium, and a capillary tube in which said medium expands, in combination with a float having an opening in which said tube is removably inserted, substantially as and for the purpose set forth.

JAS. J. HICKS.

Witnesses:
 B. J. B. MILLS,
 CLAUDE K. MILLS,
*Both of 23 Southampton Buildings, London, W. C.*